Sept. 1, 1964 R. G. SINNER 3,147,404

PACKAGING OF ELECTRICAL EQUIPMENT

Filed May 11, 1962 3 Sheets-Sheet 1

INVENTOR.
RAYMOND G. SINNER
BY Stanley H. Zeyher
AGENT

PACKAGING OF ELECTRICAL EQUIPMENT

Filed May 11, 1962 3 Sheets-Sheet 2

INVENTOR.
RAYMOND G. SINNER
BY Stanley H. Zeyher
AGENT

Sept. 1, 1964 R. G. SINNER 3,147,404

PACKAGING OF ELECTRICAL EQUIPMENT

Filed May 11, 1962 3 Sheets-Sheet 3

INVENTOR.

RAYMOND G. SINNER

BY Stanley H. Zaykee

AGENT

United States Patent Office 3,147,404

Patented Sept. 1, 1964

3,147,404

PACKAGING OF ELECTRICAL EQUIPMENT

Raymond G. Sinner, Feasterville, Pa., assignor to Philco Corporation, Philadelphia, Pa., a corporation of Delaware Filed May 11, 1962, Ser. No. 193,963
10 Claims. (Cl. 317—101)

This invention relates to improved means for packaging electrical equipment and more particularly to the application of such means to the data processing art.

While of broader applicability the invention, for illustrative purposes, will be described with specific reference to computers.

As the usefulness of computers has expanded from the strictly computational and accounting type of problem, to problems of simulating control, and others, and with the widening demand both militarily and commercially for computers capable of handling vast quantities of information at increased rates of speed, the need for high density electronic packaging has become of increasing importance. A concomitant of this trend is the need for packaging which while providing the requisite component density maintains both system reliability and serviceability.

Under the thrust of this expanding use it has become an economic necessity to provide packaging for the electronic gear comprising these systems which both minimizes the possibility of error in field maintenance procedures and reduces overall system complexity.

With increase in component density the reliability of each component part has become of paramount significance. Particularly is this true with regard to the design, construction and interconnection of circuit components and assemblages which carry out the basic work functions of the data-processing system.

Conventionally the electrical network making up, for example, the central processor of a digital computing system comprises a plurality of logic circuits such as "gates" and "flip-flops" interconnected to form an electronic complex designed to carry out the various arithmetical and logical functions for which the machine is programmed.

It is accordingly an object of this invention to reduce, from both a mechanical and an electrical standpoint, the circuit complexity of data processing systems while concurrently permitting the construction of a more compact electrical and mechanical system.

It is another object of this invention to provide a unique and greatly simplified assemblage for constructing and powering networks employing a multiplicity of printed circuit panels.

A further and more particularized object of the invention is to provide means simplifying the voltage supply system and grounding requirements of groups of printed circuit plug-in assemblies collectively forming the circuit networks comprising a typical data processing system.

Another object of the invention is to provide means for the simplification of testing, servicing and replacement of the computer's electronic subassemblies and conjointly therewith to achieve improved system reliability.

It is still another object of this invention to provide a unique assemblage the parts of which cooperate for simple yet positive support and electrical interconnection of a plurality of printed circuit panels to form a highly compact yet simplified sub-circuit for the fabrication of circuits of increased complexity.

The various features of this invention will be more fully understood by reference to the accompanying detailed description and drawing in which.

This invention, in one aspect, relates to means by which a plurality of elementary electrical circuits contained on auxiliary plug-in assemblies such, for example, as printed circuit panels may be interconnected for improved ease of access both to facilitate their test and replacement and to reduce the mechanical complexity of such systems by integration of certain essential mechanical and electrical functions.

Figure 1:
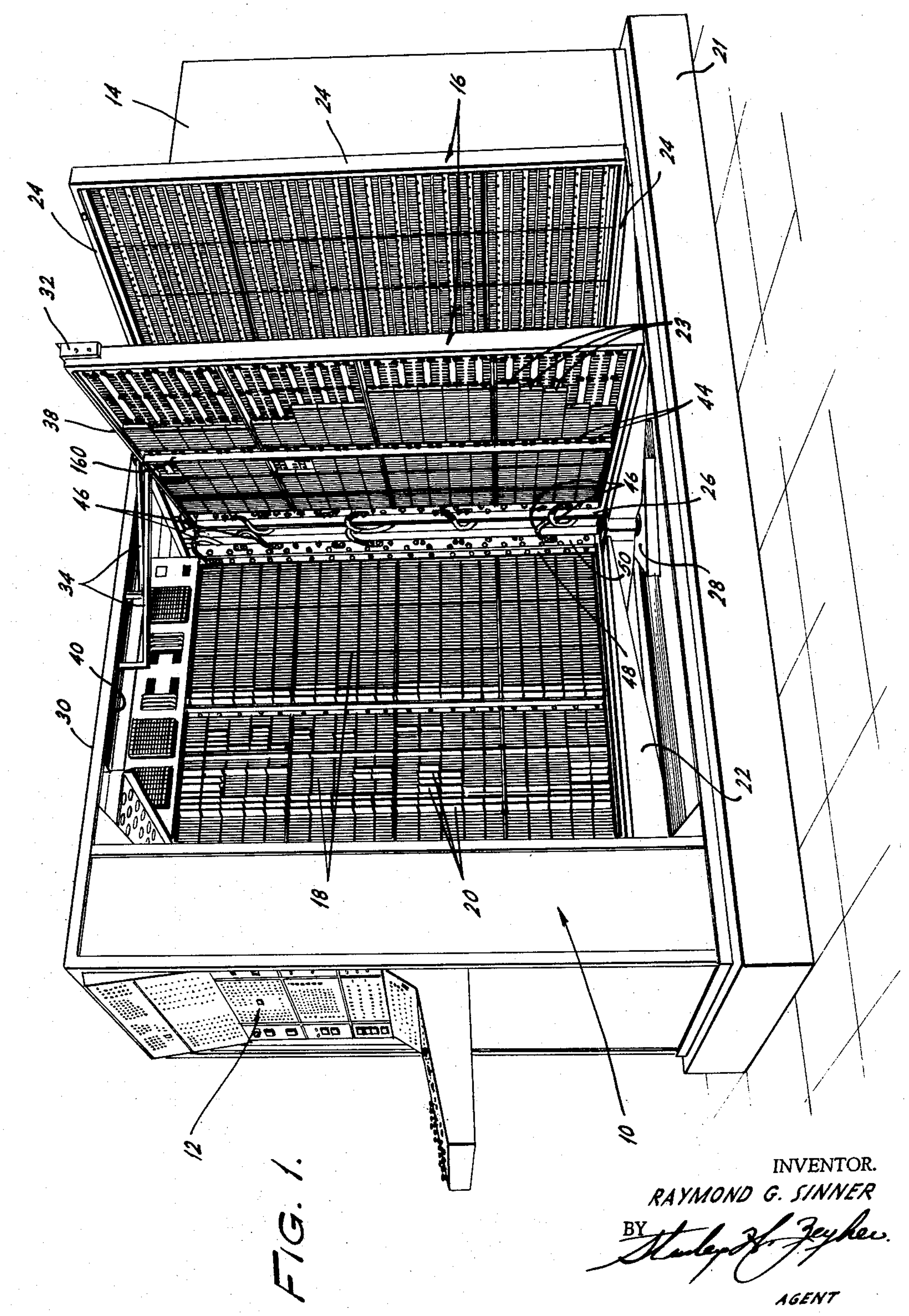
FIGURE 1 is a perspective showing of a central processing unit of a digital computer embodying the present invention, the electronic "pages" of the processor being shown in various stages of assembly and in open position to facilitate explanation.

Referring to FIGURE 1, there is shown a central processing unit 10 of a digital computer, the unit comprising a control and maintenance console 12, a self-contained power supply 14 and a plurality of pages 16, each consisting of four pairs of horizontally disposed, serially connected pans 18 each containing a great number of printed circuit panels 20. The base 21 of the unit contains a blower system designed for selective and individual cooling of each of the page assemblies, air being supplied to each page through the page bearing and triangular shaped duct 22 associated with each assembly. The blower system is the subject matter of copending application, Serial No. 229,685, filed October 10, 1962 and assigned to the assignee of the present invention. The mechanical and electrical arrangement of the panels 20, pans 18 and connectors 23 is in particular accordance with the present invention.

Certain of the pages are shown in their open position, and in various stages of fabrication in order better to illustrate the invention and to facilitate explanation of their construction. Each page is defined by a metal frame 24 hinged along its inner edge 26 to the cabinet structure 28. The pages are held in closed position within the cabinet 30 by conventional latch means 32 and are limited in their outward movement by links 34 which are pivotally secured at one end to the upper surface of the frame cross member 38, their opposite ends terminating in an upwardly presented leg portion retained within track means 40 for sliding movement therein. To facilitate securement of pans 18 to the page there is provided a recessed, vertically extending ledge along both the front and rearmost frame portions of the page which in cooperation with a medially disposed member 42 (FIGURES 2 and 4) forms a support for opposite vertical edge portions of each pan.

Figures 2, 4, 5, 6:
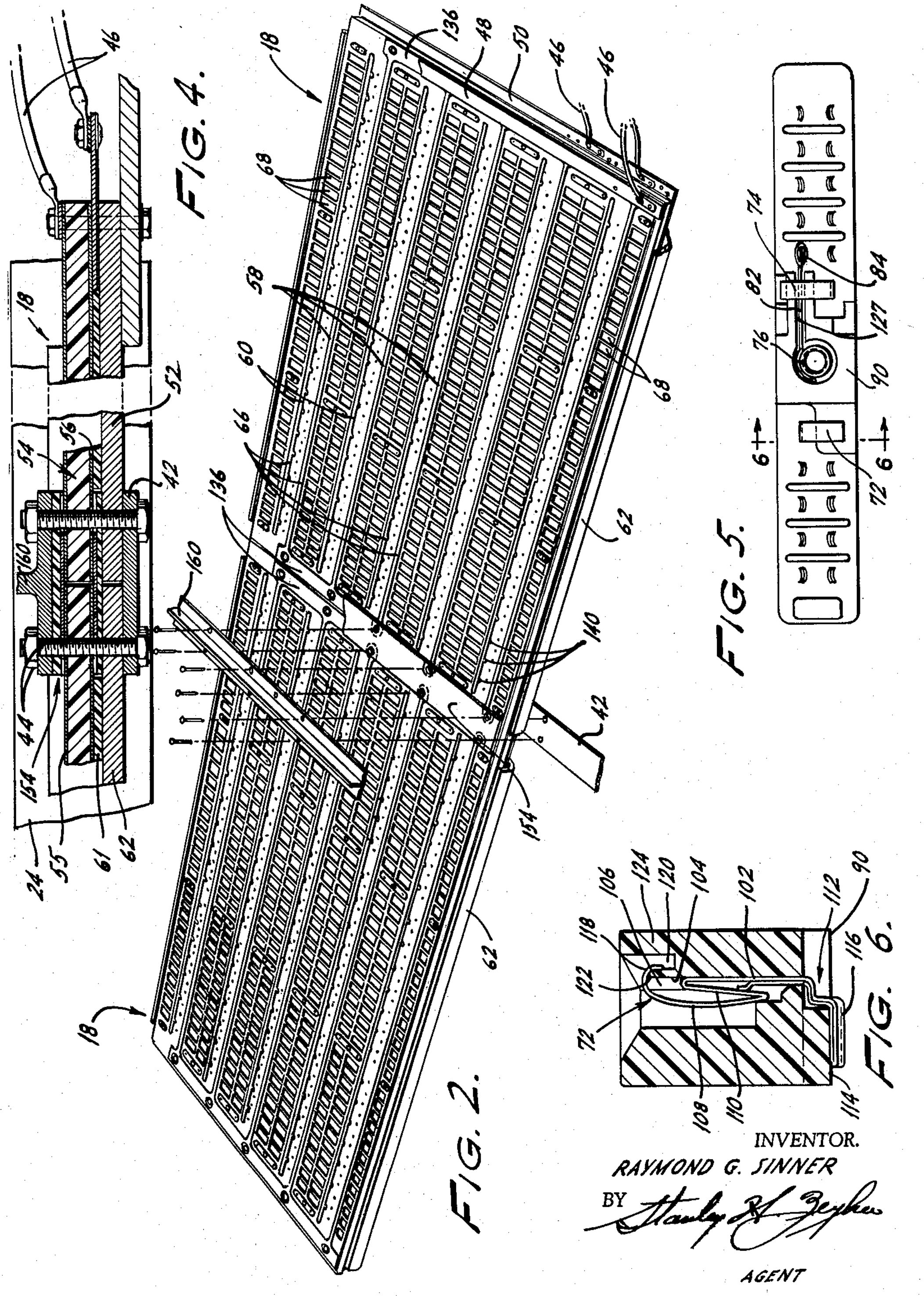
FIGURE 2 is a perspective showing of two "pan" assemblies connected in serial arrangement, the printed circuit panels and multiple contact connectors not being shown for clarity of illustration.
FIGURE 4 is a sectional view taken along the cutting plane 4—4 of FIGURE 2 showing constructional details of the electrical interconnection of adjacent pan assemblies.
FIGURE 5 is a bottom plan view of a multiple contact connector used in the inventive combination showing details of its improved construction.
FIGURE 6 is an enlarged sectional side elevation of the connector of FIGURE 5 showing details of the voltage pick-up tab.

The pans are removably secured to the page, as by nut and bolt means 44, each horizontal row of panels of one pan being electrically connected with corresponding panel rows of an adjacent pan for receipt of power from a common voltage source by means hereinafter to be described. In the embodiment shown, operating potential is supplied to the individual pages by cables 46, the positive and negative voltage connections being made respectively to the serially connected pan assemblies 18 through copper bands 48 and 50 (FIGURE 2). The preferred mode of electrically interconnecting these assemblies is best shown in FIGURES 2 and 4. By a unique arrangement the printed circuit panels in each horizontal array are fixedly secured and grounded to each pan with direct connection being made between the panels and pan through the panel-supporting connectors to plus and minus voltage buses carried by the underlying pan.

Figures 3, 3A:
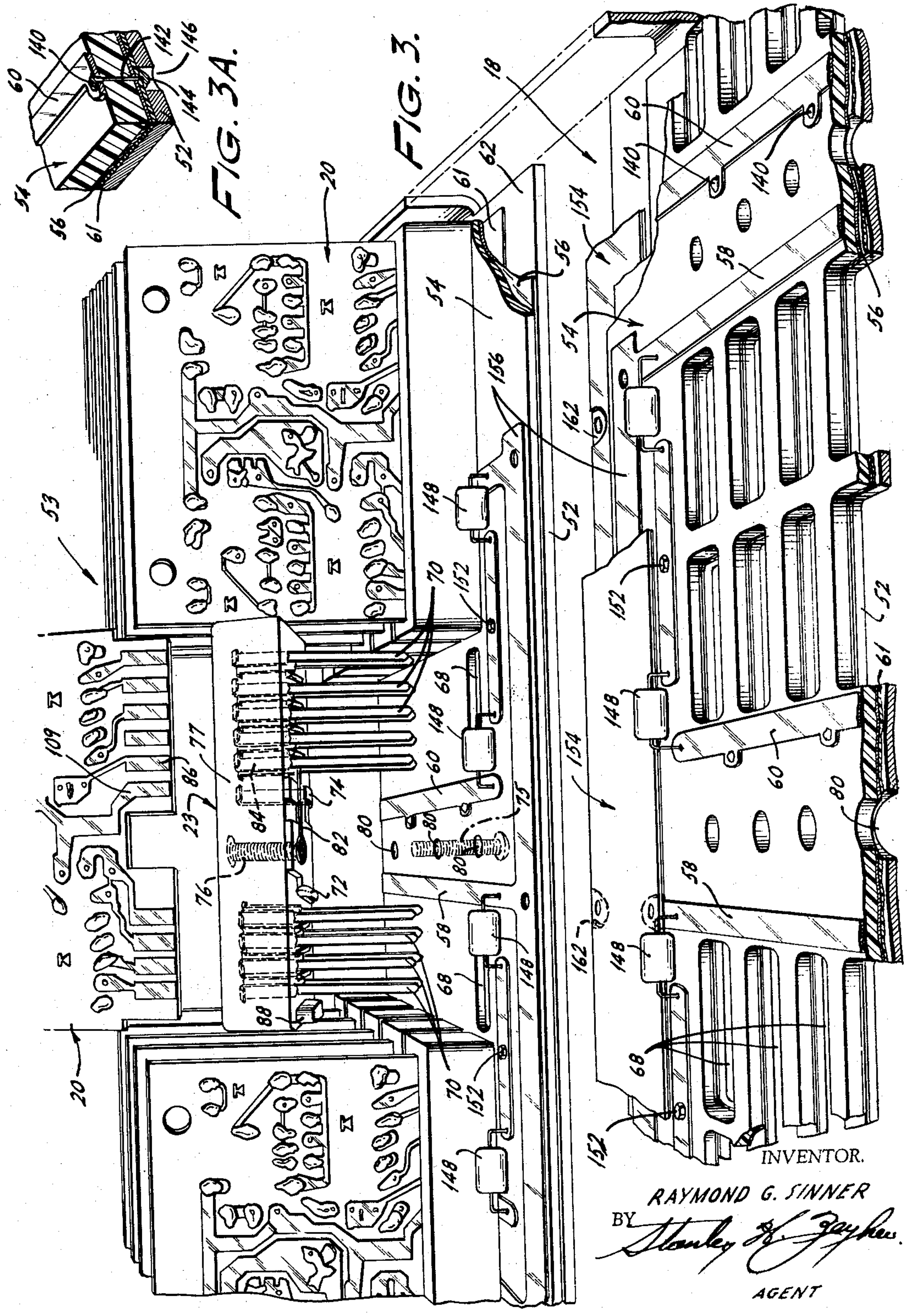
FIGURE 3 is a partially exploded view of an electronic subassembly comprising one aspect of the present invention.
FIGURE 3A is a sectional perspective showing details of the chassis assembly.

As seen in FIGURE 3 each pan 18 is a composite assembly, comprised of a ground plate 52, and an overlying insulative chassis board 54. One acceptable form of chassis is to use a copper clad laminate having formed on one face thereof as, for example, by well known photoengraving techniques, conductive paths 58 serving as positive voltage bus bars, and paths 60 serving as negative voltage bus bars. The undersurface of the chassis is completely covered by copper sheeting 56, which in cooperation with the conductive strips 60, serves as a negative current path. Directly underlying the electrically conductive sheeting or foil 56 and interposed between it and the ground plate 52 is a 10 mil insulative sheet 61 made of melamine or other suitable material which acts to insulate the copper clad undersurface of the chassis from ground. The ground plate 52 serves as a support member for the assembly 53 and is provided with outwardly extending lip portions 62, to facilitate attachment of the assembly to the "page" frame structure 24 in the manner earlier discussed. One means of securement is detailed in FIGURE 4, the nut and bolt means 44 grounding the plate 52, through lip 62, to the medial rail 42 of the page frame 24. The pan 18 may be of any convenient size, the one illustrated being approximately 12" by 24" and being provided with five pairs 66 of voltage tracks 58–60 (see FIGURE 2). Each track pair provides the negative and positive voltages required to power the plug-in printed circuit cards 20. The ground plate 52, insulative sheet 61, and chassis 54 are further provided with a plurality of aligned elongate apertures 68 (FIGURE 3) for receipt and passage therethrough of connector contact terminal portions 70 (central area, FIGURE 3) to permit the connector voltage pick-up tabs 72 and 74 to be drawn into electrically conductive contact with the voltage supply tracks 58 and 60 on tightening of machine screw 75 (shown in phantom in FIGURE 3) in the threaded metallic insert 76 provided within body portion 77 of connector 23. The printed circuit cards 20, connector 23 and pan 18 are shown in FIGURE 3 in exploded view with the printed circuit card 79 withdrawn from mating engagement with the connector. To facilitate securement of connector 23 to pan 18 the connector, as indicated above, is constructed with an internally threaded insert or bushing 76 adapted for threading engagement with machine screw 75. Apertures 80 are provided in the composite pan assembly 18 to pass the shank of screw 75, which screw serves both mechanically to hold the connector in place and to provide an electrical ground connection for the cards 79 when they are brought into mating engagement with the connector. The path to ground is from plate 52 through the mounting screw 75 and bushing 76 across jumper wire or bus 82 (FIGURE 5) to connector contact 84, ground being supplied to the printed circuit card 20 through terminal elements 86, only one of which is shown. To prevent rotation of the connector it is provided with a downwardly directed prominence or boss 88, which is lockingly engaged with edge portions of slot 68 when installed.

The connector is desirably provided with a centrally located boss 90 on which the connector seats when installed. As seen, tabs 72 and 74 are disposed in a direction substantially parallel to the face of the pan assembly's upper surface and are so constructed and arranged as to be placed in pressure bearing relation with the voltage tracks 58 and 60 when the connector is locked in position. One desirable arrangement is to construct the voltage pick up tabs so that in their rest position they are disposed in a direction which is generally oblique to the plane defined by the surface of the boss over which they extend. In a construction of this type the tabs are drawn into resilient pressure-bearing contact with the voltage buses on tightening of the mounting screw 75. By means of the above described structural organization the connector and pan assembly 18 cooperate in such manner that a plurality of connectors may be fixedly secured to each pan with each connector-supported printed circuit card individually connected to ground with connection automatically made to plus and minus bus bars carried by the pan, and with connector contact terminal portions 70 extending through apertures formed in the pan for wire wrap or solder connection with external circuitry. The individual printed circuit cards 20 are both supported and grounded through the agency of mounting screws 75. This construction may be modified in accordance with the particular application to bring one or more connector contacts into electrical connection with the ground plate 52. There is thus provided an assemblage the parts of which cooperate for simple yet positive support and electrical connection for a large number of printed circuit panels, the mounting arrangement being such as to facilitate access to the panels for test, servicing or replacement.

Details of one preferred connector construction are shown in FIGURES 5 and 6. Referring to FIGURE 6, which is a sectional view taken along the cutting plane 6—6 as shown in FIGURE 5, the contact 72 comprises a generally bellows-shaped spring unit made from strip spring stock such as spring tempered Phosphor bronze which has been nickel plated with a gold overlay for obtaining low-resistance contact. The unit has three branches, an innermost branch 102 which seats against the inside wall 104 of pocket 106, an outermost branch 108 which forms that portion of the contact which engages the electrical element of a mating plug assembly, such for example as element 109 shown in FIGURE 3, and an intermediate branch 110 forming a resilient spring connection between the other two branches. The external portion 112 of the contact is snaked out of the body of the receptacle into overlying relation with the boss 114, this being an extension of the centrally disposed boss 90, the strip being folded back on itself to form a resilient pad 116 which serves as the voltage pick-up element of the contact. The outer generally arcuate shaped branch 108 of the contact terminates at its upper end in an involutional curve 118 having a range of motion delimited by the recess 120 formed between the shoulder 122 and the receptacle outer wall 124.

One arrangement, designed to insure positive seating of the connector boss 90 against the pan's upper surface, is to recess the boss 114 over which the connector tab portion 116 extends sufficiently to accommodate the tab when in its compressed state.

FIGURE 5 shows the undersurface of the connector and one structural arrangement for integrating its grounding and support functions. This end is achieved by tying one of the connector contacts, here contact 84, to the receptacle mounting bushing 76 by means of an electrically conductive ground wire or bus 82. In the illustrated embodiment the ground bus 82 passes beneath the voltage pick-up tab 116 through a channel 127 provided in connector body portion 90. The ground bus is shown exposed but may, if desired, be encapsulated or molded into the body of the receptacle. The body of the connector is preferably composed of some readily moldable insulative material, such for example, as glass-filled diallyl phthalate.

A connector of this type coupled with the structural organization previously described uniquely permits a plurality of printed circuit panels to be both supported and grounded through the agency of a common supporting pan with automatic connection being made to the panels, through the connector, with plus and minus bus bars carried by a pan-supported chassis. Connection to external circuits is readily facilitated by means of connector terminals extending through apertures 68 provided in the pan assembly 18. The terminals shown have a generally U-shaped cross sectional configuration which is adapted for either wire wrap or solder connection with external wiring.

Additionally, this structural organization facilitates the fabrication of complex systems through interconnection of banks of pans. A preferred arrangement, used in the construction of the electrical complex comprising each of the pages of the data processor shown in FIGURE 1, is detailed in FIGURE 2. The assembly shown constitutes a row of pans 18 such as found in a computer page, which pans cooperatively act in the performance of the arithmetic and control functions of the computer. As previously discussed D.C. voltage is supplied to each assembly of pans by cables 46 coupled to the lead pan by copper bands 48 and 50. The electrically conductive strip 136, formed on the upper surface of the chassis 54, to which the band 48 is affixed, supplies positive potential to each of the voltage rails 58. Each chassis is provided with two such strips at its opposite ends to facilitate the electrical interconnection of adjacent pans. The two edge strips 136 of each chassis are placed in electrical communication with each other by the grid work of parallel bus bars 58 each of which forms the positive voltage rail of each pair of voltage tracks 66 against which the connector voltage pick-up tabs 72 and 74 are designed to be placed in pressure bearing contact. Negative voltage is applied to the pan by the copper strap 50 secured to the chassis' copper clad undersurface 56. The negative voltage strap 134 is supported on the machine frame and is insulated therefrom by an interposed layer of insulative material, not shown.

Interconnection between the copper clad undersurface 56 and the negative voltage buses 60 is made at a multiplicity of locations 140, as best seen in FIGURE 3A, by a soldered-in-place jumper wire 142. To prevent shorting of the solder connection 144 to the ground plate 52 the plate is provided with a clearance hole 146. Connections are made at a plurality of points to minimize ground loops and to reduce "cross-talk." To optimize circuit isolation the negative and positive voltage buses are capacitively coupled to ground as shown in FIGURE 3, at locations 148, through copper islands 150 directly connected to ground plate 52 by nut and bolt means 152.

Successive pan assemblies are serially interconnected by means of tie bands 154. These bands are of composite construction comprising an insulative sheet one face of which is copper clad. The copper clad surface is disposed inwardly as seen in FIGURE 4, and is brought into direct contact with adjacent copper land areas 136 carried by the pans in order to place the positive voltage buses carried by each of the pans in direct electrical communication. A similar tie band with its copperized surface facing upwardly (see FIGURE 3) electrically interconnects the chassis copper clad undersurfaces. The outer insulative surface of the tie band and the cut away portion 162 provided around each of the bolt clearance holes prevents grounding of the electrical system.

The tie bands, as seen in FIGURE 4, are mechanically sandwiched between the cross bars 42 and 160 which members when secured in position act compressively to seat the electrically conductive surfaces of the composite assembly.

This invention in its various aspects serves greatly to reduce the complexities of computer circuit fabrication and wiring, and makes available a simplified assembly for the construction of complex circuit arrays which facilitates access to connector-supported panels and associated component parts of the assembly for test, servicing, and replacement.

While a preferred embodiment, illustrative of the invention has been depicted and described, modifications may be made therein without departing from the scope of the present invention. It will be understood, however, that such changes and modifications are contemplated as come within the purview of the appended claims.

I claim:

1. An assemblage comprised of a ground plate, a chassis consisting of electrically conductive path means carried by a supporting insulative member mounted upon said ground plate, and a series of electrical connectors mounted to said chassis, said connectors having an electrically insulative body portion provided with a plurality of spaced contacts constructed and arranged for engagement with electrical elements of a mating plug assembly, and said contacts having terminal portions certain of which extend through apertured regions provided in said chassis and ground plate for connection with external circuits, and certain others of which are disposed in a direction generally parallel to the plane defined by said path means and in registration with surface portions thereof; means permitting securement of said connector to said chassis and for maintaining said last mentioned contact terminal portions in pressure-bearing contact with surface portions of said path means, and means, including said last mentioned means, providing an electrically conductive path between at least one of said connector contacts and said ground pltae.

2. The assembly comprising a ground plate, electrically conductive path means, insulative means interposed between said ground plate and path means; a plurality of electrical connectors each having an electrically insulative body portion provided with a plurality of spaced contacts adapted for engagement with associated electrical termini of a mating plug assembly and certain of said contacts having terminal portions disposed in contact with surface portions of said path means, means carried by said connector for holding said last mentioned terminal portions in contact with said path means, and means, including said last mentioned means, effecting electrical connection of at least one of said contacts with said ground plate.

3. The assembly comprising a ground plate, electrically conductive path means carried by an insulative support structure mounted upon said ground plate and a plurality of electrical connectors mounted on said support structure, said connectors each having a plurality of spaced contacts constructed and arranged to engage associated electrical termini of a mating plug assembly, and said contacts having terminal portions certain of which extend beyond the support-contacting surface of said connector and through apertured regions provided in said plate and said support structure, and others of which are disposed in a direction generally conforming to the plane defined by said path means and in direct overlying relation thereto, means securing said connectors to said support structure and placing said last mentioned terminal portions in pressure-bearing contact with said path means, and means including said last mentioned means, carried by said receptacle providing an electrically conductive path between at least one of said contacts and said ground plate, and a plurality of plug-in assemblies provided with circuit termini held in engagement with mating contact elements of an associated electrical connector whereby each of said connector-supported assemblies is placed in electrical communication with said path means and said ground plate.

4. In combination, a chassis comprised of electrically conductive path means on an insulative support, a plurality of electrical connectors mounted upon said chassis, said connectors having an electrically insulative body portion housing a plurality of spaced contacts adapted for engagement with electrical elements of a mating plug assembly, and certain of said contacts having terminal portions in abutting pressure bearing relation with surface portions of said path means, a ground plate, means securing said connectors to said chassis and maintaining said terminal portions in contact with said path means, and means, including said securement means, electrically connecting at least one of said contacts with said ground plate.

5. In combination; a chassis comprised of electrically conductive path means disposed on an insulative support, a plurality of electrical connectors mounted upon said chassis, said connectors having a plurality of spaced contacts adapted for engagement with electrical elements of a mating plug assembly and certain of said contacts having treminal portions in pressure bearing relation with said path means; electrical grounding means disposed contiguous said chassis; and means holding said contact terminal portions in surface contact with said path means and effective in electrically connecting at least one of said contacts to said grounding means.

6. The assembly comprising a ground plate, electrically conductive path means, insulative means interposed between said ground plate and path means; a plurality of electrical connectors each having an electrically insulative body portion housing a plurality of spaced contacts adapted for engagement with associated electrical termini of a mating printed circuit panel and certain of said contacts having terminal portions disposed in contact with surface portions of said path means, means carried by said connector for holding said last mentioned terminal portions in contact with said path means, means, including said last mentioned means, electrically connecting at least one of said contacts with said ground plate, and a plurality of printed circuit panels supported by said connectors in electrical communication with said path means and with said ground plate.

7. The combination comprising, an insulative member supporting a pair of voltage buses, a connector having a plurality of spaced contacts adapted for engagement with associated electrical termini of a mating printed circuit panel and certain of said contacts having terminal portions disposed in pressure bearing relation with surface portions of said voltage buses, mounting means securing said connector to said support and maintaining said terminal portions in contact with said voltage buses, a ground plate, means, carried by said connector, and including said last mentioned means providing an electrical connection between at least one of said contacts and said ground plate, and a printed circuit panel provided with circuit termini engaged by mating contact elements of said connector and supported thereby in electrical communication with said voltage buses and said ground plate.

8. In combination, electrically conductive path means, a plurality of electrical connectors mounted contiguous said path means, said connectors each having a plurality of spaced contacts adapted for engagement with electrical elements of a mating plug assembly and certain of said contacts having terminal portions disposed in pressure-bearing contact with said path means, means forming an electrical ground, connector mounting means, and means inclusive of said connector mounting means providing an electrically conductive path between said ground and at least one of said contacts.

9. For use in data processing equipment, and the like, the assembly comprising: a plurality of printed circuit panels, a chassis comprised of a ground plate, electrically conductive path means and insulative means interposed between said ground plate and said path means; a plurality of multiple contact connectors mounted upon said chassis supporting said panels through engagement thereof with circuit terminal elements of said panels and having voltage pick-up tabs in surface contact with said path means, whereby said panel is placed in direct electrical communication with said path means; and means inclusive of the connector mounting and providing an electrically conductive path between at least one of said connector contacts and said ground plate.

10. In data processing equipment, and the like, the organization comprising: a plurality of plug-in assemblies supported by multiple contact connectors; a ground plate mounting an insulative member carrying electrically conductive path means and upon which member said connectors are mounted, said ground plate and insulative member having apertured regions for the receipt and passage therethrough of connector contact terminal portions and said connector having bent-under voltage pick-up tabs in pressure contact with said path means, whereby the plug-in assembly which it supports is placed in electrical communication with said path means; and means inclusive of the connector mounting and providing an electrically conductive path between at least one of said connector contacts and said ground plate.

References Cited in the file of this patent

UNITED STATES PATENTS 2,832,013 Pedersen et al. ---------- Apr. 22, 1958